US007664668B2

(12) United States Patent
Lissy et al.

(10) Patent No.: US 7,664,668 B2
(45) Date of Patent: Feb. 16, 2010

(54) LEAD MANAGEMENT IN MULTI-TIERED SALES ORGANIZATIONS

(75) Inventors: Gregory P. Lissy, Seattle, WA (US); Kevin D. Kraemer, Menlo Park, CA (US); Aaron R. Stein, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1210 days.

(21) Appl. No.: 10/737,946

(22) Filed: Dec. 17, 2003

(65) Prior Publication Data

US 2007/0239514 A1  Oct. 11, 2007

Related U.S. Application Data

(60) Provisional application No. 60/528,159, filed on Dec. 9, 2003.

(51) Int. Cl.
    *G06Q 10/00* (2006.01)
(52) U.S. Cl. ........................................................ 705/9
(58) Field of Classification Search .................... None
    See application file for complete search history.

(56) References Cited

U.S. PATENT DOCUMENTS

| 7,228,284 | B1 * | 6/2007 | Vaillancourt et al. .......... 705/10 |
| 2002/0026356 | A1 * | 2/2002 | Bergh et al. .................... 705/14 |
| 2004/0064360 | A1 * | 4/2004 | Meggs ........................... 705/10 |

OTHER PUBLICATIONS

"Account Management." SalesForce.com, Inc. Dec. 8, 2003 (2 pages) <http://salesforce.com/us/products/feature.jsp?name=account-mgmt>.
"Account Management." Siebel Systems, Inc. Dec. 10, 2003 (1 page) <http://www.upshot.com/sales/account_management.html>.
"Activity Management." SalesForce.com, Inc. Dec. 8, 2003 (2 pages) <http://salesforce.com/us/products/feature.jsp?name=activity-mgmt>.
"Activity Management." Siebel Systems, Inc. Dec. 10, 2003 (2 page) <http://www.upshot.com/sales/activity_management.html>.

(Continued)

Primary Examiner—Jonathan G Sterrett
(74) Attorney, Agent, or Firm—Campbell Stephenson LLP

(57) ABSTRACT

Techniques are described that provide automated sales-related assistance to sales organizations, such as for multi-tiered sales organizations that are clients of a multi-tenanted network-accessible server hosting a sales lead management service. The automated assistance may include assisting first-tier sales development representatives to qualify leads as sufficiently developed to allow a second-tier sales representatives to efficiently develop sales from them, and by further assisting the second-tier sales representatives to provide meaningful feedback that addresses problems in the lead qualifying process, such as by notifying a sales development representative of the reasons that one of their qualified sales lead was rejected by a sales representative and prompting resolution by that sales development representative. This abstract is provided to comply with rules requiring an abstract, and it is submitted with the intention that it will not be used to interpret or limit the scope or meaning of the claims.

21 Claims, 10 Drawing Sheets

OTHER PUBLICATIONS

"Advanced Integration." Siebel Systems, Inc. Dec. 11, 2003 (1 page) <http://www.upshot.com/enterprise/advanced_integration.html>.

"Analytics: Valuable customer and business insight on demand." SalesForce.com, Inc. Dec. 8, 2003 (4 pages) <http://salesforce.com/us/products/analytics.jsp>.

"Auto-Response Management." SalesForce.com, Inc. Dec. 8, 2003 (2 pages) <http://salesforce.com/us/products/feature.jsp?name=auto-response-mgmt>.

"Big Deal Alerts." SalesForce.com, Inc. Dec. 8, 2003 (2 pages) <http://salesforce.com/us/products/feature.jsp?name=big-deal-alerts>.

"Campaign Management." SalesForce.com, Inc. Dec. 8, 2003 (2 pages) <http://salesforce.com/us/products/feature.jsp?name=campaign-mgmt>.

"Campaign Management." Siebel Systems, Inc. Dec. 11, 2003 (1 page) <http://www.upshot.com/marketing/campaign_management.html>.

"Case Management." SalesForce.com, Inc. Dec. 8, 2003 (2 pages) <http://salesforce.com/us/products/feature.jsp?name=case-mgmt>.

"Case Study: Tight Integration between Salesforce.com and Integral Systems Makes World od Difference for Globix." SalesForce.com, Inc. Dec. 8, 2003 (5 pages) <http://salesforce.com/us/customers/casestudy.jsp?customer=globix>.

"Computer Telephony Integration (CTI)." SalesForce.com, Inc. Dec. 8, 2003 (2 pages) <http://salesforce.com/us/products/feature.jsp?name=computer-telephony-integration>.

"Configuration." Siebel Systems, Inc. Dec. 10, 2003 (1 page) <http://www.upshot.com/sales/configuration.html>.

"Contract Management: Taking CRM a step further. Frm campaigns to close." SalesForce.com, Inc. Dec. 8, 2003 (2 pages) <http://salesforce.com/us/products/contracts.jsp>.

"CRM Online—Customer Relationship Management On Demand." SalesForce.com, Inc. Dec. 5, 2003 (2 pages) <http://www.salesforce.com/us/products>.

"Customer Satisfaction." SalesForce.com, Inc. Dec. 8, 2003 (2 pages) <http://salesforce.com/us/products/feature.jsp?name=cust-satisfaction>.

"Customer Self-Service Portal." SalesForce.com, Inc. Dec. 8, 2003 (3 pages) <http://salesforce.com/us/products/feature.jsp?name=css-portal>.

"Customer Service & Support: Meeting today's service challenges head-on." SalesForce.com, Inc. Dec. 8, 2003 (3 pages) <http://salesforce.com/us/products/customer-service-support.jsp>.

"Email Marketing." SalesForce.com, Inc. Dec. 8, 2003 (2 pages) <http://salesforce.com/us/products/feature.jsp?name=email-marketing>.

"Email Prospecting and Tracting." SalesForce.com, Inc. Dec. 8, 2003 (2 pages) <http://salesforce.com/us/products/feature.jsp?name=email-prospecting-tracking>.

"Escalation and Notification." SalesForce.com, Inc. Dec. 8, 2003 (2 pages) <http://salesforce.com/us/products/feature.jsp?name=escalation-notification>.

"File & Document Management: Your on-demand resource for sales, marketing, and support materials." SalesForce.com, Inc. Dec. 8, 2003 (2 pages) <http://salesforce.com/us/products/file-document-management.jsp>.

"Forecasting." Siebel Systems, Inc. Dec. 10, 2003 (4 page) <http://www.upshot.com/sales/forecasting.html>.

"Frequently Asked Questions." SalesForce.com, Inc. Dec. 8, 2003 (16 pages) <http://salesforce.com/us/products/faq.jsp>.

"Frequently Asked Questions." Siebel Systems, Inc. Dec. 10, 2003 (9 page) <http://www.upshot.com/sales/faqs.html>.

"Global 'Follow-the Sun' Support." SalesForce.com, Inc. Dec. 8, 2003 (2 pages) <http://salesforce.com/us/products/feature.jsp?name=global-support>.

"Global Forecasting." SalesForce.com, Inc. Dec. 8, 2003 (2 pages) <http://salesforce.com/us/products/feature.jsp?name=global-forecasting>.

"Increased ROI." Siebel Systems, Inc. Dec. 11, 2003 (1 page) <http://www.upshot.com/marketing/increased_roi.html>.

"Knowledge Management." SalesForce.com, Inc. Dec. 8, 2003 (2 pages) <http://salesforce.com/us/products/feature.jsp?name=knowledge-mgmt>.

"Lead Management." SalesForce.com, Inc. Dec. 8, 2003 (2 pages) <http://salesforce.com/us/products/feature.jsp?name=lead-mgmt>.

"Lead Management." Siebel Systems, Inc. Dec. 10, 2003 (1 page) <http://www.upshot.com/sales/lead_management.html>.

"Lotus Notes Integration." Siebel Systems, Inc. Dec. 11, 2003 (1 page) <http://www.upshot.com/productivity/loyus_integration.html>.

"Marketing Analytics." SalesForce.com, Inc. Dec. 8, 2003 (2 pages) <http://salesforce.com/us/products/feature.jsp?name=marketing-analytics>.

"Marketing Automation: Embracing the brave new world of marketing." SalesForce.com, Inc. Dec. 8, 2003 (3 pages) <http://salesforce.com/us/products/marketing-automation.jsp>.

"Marketing Encyclopedia." SalesForce.com, Inc. Dec. 8, 2003 (2 pages) <http://salesforce.com/us/products/feature.jsp?name=marketing-encyclopedia>.

"Marketing Reports." Siebel Systems, Inc. Dec. 11, 2003 (1 page) <http://www.upshot.com/marketing/marketing_reports.html>.

"Marketing: Maximize Campaign ROI." Siebel Systems, Inc. Dec. 1, 2003 (3 pages) <http://www.crmondemand.com/products/marketing.jsp>.

"Microsoft Outlook Edition." SalesForce.com, Inc. Dec. 8, 2003 (2 pages) <http://salesforce.com/us/products/feature.jsp?name=outlook-edition>.

"Microsoft Word and Excel Integration." SalesForce.com, Inc. Dec. 8, 2003 (2 pages) <http://salesforce.com/us/products/feature.jsp?name=word-excel-integration>.

"Mobile Services." Siebel Systems, Inc. Dec. 10, 2003 (2 page) <http://www.upshot.com/mobile/mobile.html>.

"Mobile Solutions." SalesForce.com, Inc. Dec. 8, 2003 (2 pages) <http://salesforce.com/us/products/feature.jsp?name=mobile-solutions>.

"MultiProcess Management." Siebel Systems, Inc. Dec. 11, 2003 (1 page) <http://www.upshot.com/enterprise/multi_process_support.html>.

"Office Integration." Siebel Systems, Inc. Dec. 11, 2003 (2 page) <http://www.upshot.com/productivity/office_integration.html>.

"Online Case Capture." SalesForce.com, Inc. Dec. 8, 2003 (2 pages) <http://salesforce.com/us/products/feature.jsp?name=online-case-capture>.

"Opportunity Management." SalesForce.com, Inc. Dec. 8, 2003 (2 pages) <http://salesforce.com/us/products/feature.jsp?name=opp-mgmt>.

"Opportunity Management." Siebel Systems, Inc. Dec. 10, 2003 (1 page) <http://www.upshot.com/sales/opportunity_management.html>.

"Outlook Integration with E-Mail." Siebel Systems, Inc. Dec. 11, 2003 (1 page) <http://www.upshot.com/productivity/outlook_integration.html>.

"Palm Synchronization." SalesForce.com, Inc. Dec. 8, 2003 (2 pages) <http://salesforce.com/us/products/feature.jsp?name=palm-synchronization>.

"Partner Management." Siebel Systems, Inc. Dec. 10, 2003 (1 page) <http://www.upshot.com/sales/partner_management.html>.

"Products and Annuity Tracking." Siebel Systems, Inc. Dec. 11, 2003 (1 page) <http://www.upshot.com/enterprise/products_annuity_tracking.html>.

"Real-Time Alerts." SalesForce.com, Inc. Dec. 8, 2003 (2 pages) <http://salesforce.com/us/products/feature.jsp?name=real-time-alerts>.

"Sales Analytics." SalesForce.com, Inc. Dec. 8, 2003 (2 pages) <http://salesforce.com/us/products/feature.jsp?name=sales-analytics>.

"Sales Force Automation: Unifying slaes organizations for success." SalesForce.com, Inc. Dec. 8, 2003 (3 pages) <http://salesforce.com/us/products>.

"Salesforce.com Integration Server Powered by TIBCO: A smarter, stronger, similar approach to integration." SalesForce.com, Inc. Dec. 8, 2003 (2 pages) <http://salesforce.com/us/products/tibco.jsp>.

"Sales Literature." SalesForce.com, Inc. Dec. 8, 2003 (2 pages) <http://salesforce.com/us/products/feature.jsp?name=sales-literature>.

"Sales Reports." Siebel Systems, Inc. Dec. 10, 2003 (2 page) <http://www.upshot.com/sales/sales_reports.html>.

"Security." Siebel Systems, Inc. Dec. 10, 2003 (1 page) <http://www.upshot.com/sales/security.html>.

"Service Analytics." SalesForce.com, Inc. Dec. 8, 2003 (2 pages) <http://salesforce.com/us/products/feature.jsp?name=service-analytics>.

"Sforce: Customize, Integrate, Extend. Custom-tailored CRM, minus the complexity." SalesForce.com, Inc. Dec. 8, 2003 (3 pages) <http://salesforce.com/us/products/sforce.jsp>.

"Sforce Features." SalesForce.com, Inc. Dec. 8, 2003 (2 pages) <http://www.sforce.com/us>.

"Sforce Resources." SalesForce.com, Inc. Dec. 8, 2003 (2 pages) <http://www.sforce.com/us/resources/api.jsp>.

"Siebel CRM OnDemand: For 10 years, Siebel Systems and IBM have raised the bar on CRM. Now, we're lowering the hurdles." Siebel Systems, Inc. Dec. 1, 2003 (8 pages) <http://www.crmondemand.com/products/crmondemand_brochure_reg.jsp>.

"Siebel CRM OnDemand Marketing Data Sheet." Siebel Systems, Inc. Dec. 1, 2003 (4 pages) <http://www.crmondemand.com/products/marketing_datasheet_reg.jsp>.

"Siebel CRM OnDemand—UpShot Edition: Leads to sales." Siebel Systems, Inc. Dec. 5, 2003 (2 pages) <http://www.upshot.com/products/upshot_products.html>.

"Siebel Systems and IBM Launch Siebel CRM OnDemand." Siebel Systems, Inc. Dec. 1, 2003 (4 pages) <http://www.crmondemand.com/news_events/press_releases/031001_launch.jsp>.

"Stay-in-Touch Relationship Builder." SalesForce.com, Inc. Dec. 8, 2003 (2 pages) <http://salesforce.com/us/products/feature.jsp?name=stay-in-touch>.

"Team Selling." SalesForce.com, Inc. Dec. 8, 2003 (2 pages) <http://salesforce.com/us/products/feature.jsp?name=team-selling>.

"Territory Management." SalesForce.com, Inc. Dec. 8, 2003 (2 pages) <http://salesforce.com/us/products/feature.jsp?name=territory-mgmt>.

"Territory Management." Siebel Systems, Inc. Dec. 10, 2003 (1 page) <http://www.upshot.com/sales/territory_management.html>.

"The UpShot Dashboard." Siebel Systems, Inc. Dec. 10, 2003 (2 page) <http://www.upshot.com/sales/dashboard.html>.

"Trackable HTML Email Templates." SalesForce.com, Inc. Dec. 8, 2003 (2 pages) <http://salesforce.com/us/products/feature.jsp?name=trackable-HTML-email-templates>.

"UpShot Enterprise Capabilities." Siebel Systems, Inc. Dec. 11, 2003 (1 page) <http://www.upshot.com/enterprise/enterprise_capabilities.html>.

"UpShot Marketing Automation." Siebel Systems, Inc. Dec. 11, 2003 (1 page) <http://www.upshot.com/marketing/marketing_automation.html>.

"UpShot Offline Express." Siebel Systems, Inc. Dec. 10, 2003 (2 page) <http://www.upshot.com/productivity/offline_access.html>.

"UpShot Rep Productivity." Siebel Systems, Inc. Dec. 11, 2003 (2 page) <http://www.upshot.com/productivity/rep_productivity.html>.

"UpShot Sales Force Automation." Siebel Systems, Inc. Dec. 10, 2003 (1 page) <http://www.upshot.com/sales/sales_force_automation.html>.

"UpShot Support Automation." Siebel Systems, Inc. Dec. 11, 2003 (11 page) <http://www.upshot.com/support_automation/support_automation.html>.

"Workflow Automation." SalesForce.com, Inc. Dec. 8, 2003 (2 pages) <http://salesforce.com/us/products/feature.jsp?name=workflow-automation>.

* cited by examiner

Example Lead Qualifying Results Screen

Lead Detail for John Keller    Help Tutorial Back

Edit Layout  Printer Friendly

Key Lead Information:

- Mr./Ms.
- First Name    John
- Last Name    Keller
- Company
- Job Title
- Created By    06/29/2003 1:59 PM

- Primary Phone #
- Cellular Phone #
- Work Fax #
- Email
- Never Email
- Modified By    06/29/2003 2:01 PM

Opportunity Related Information:

- Status    Qualified  ~ 107a
- Lead Temperature    B  ~ 107b
- Product Interest
- Potential Revenue
- Estimated Close Date
- Next Step

- Source
- Campaign
- Industry
- Annual Revenues
- Number of Employees

Additional Information:

- Associated Account
- Associated Contact
- Associated Opportunity
- Lead Owner    Sales Development Rep ABC  ~ 108a
- Reassign Lead Owner    ☐  ~ 108c
- Sales Person    Sales Rep DEF  ~ 108b
- Description

- Address
- City
- State/Province
- Zip/Postal Code
- Country
- Website

*FIG. 1B*

Example Qualified Lead Management Screen for Sales Representative DEF

Lead Detail for John Keller — 102

Help Tutorial Back
105b, 105f, 105g, 105e
Edit | Convert | Reject | Archive

Key Lead Information: — 106

| | | | |
|---|---|---|---|
| Mr./Ms. | | Primary Phone # | |
| First Name | John | Cellular Phone # | |
| Last Name | Keller | Work Fax # | |
| Company | | Email | |
| Job Title | | Never Email | ☐ |
| Created By | mj 05/29/2003 1:59 PM | Modified By | mj 09/29/2003 2:01 PM |

Opportunity Related Information: — 107

| | | | |
|---|---|---|---|
| Status | Qualified — 107a | Source | |
| Lead Temperature | B — 107b | Campaign | |
| Product Interest | | Industry | |
| Potential Revenue | | Annual Revenues | |
| Estimated Close Date | | Number of Employees | |
| Next Step | | | |

Additional Information: — 108

| | | | |
|---|---|---|---|
| Associated Account | | Address | |
| Associated Contact | | City | |
| Associated Opportunity | | State/Province | |
| Lead Owner | Sales Development Rep ABC | Zip/Postal Code | |
| Reassign Lead Owner | ☐ | Country | |
| Sales Person | Sales Rep DEF | Website | |
| Description | | | |

101
105
Home | Calendar | Leads | Campaigns | Accounts | Contacts | Opportunities | Reports | Dashboard
Edit Layout Printer Friendly Search — 110
Contacts
Advanced Search Create — 103
Task
Appointment
Contact
Opportunity
Account
Lead
Service Request
Solution

FIG. 1C

Example Qualified Lead Conversion To Opportunity Results Screen for Sales Representative DEF

FIG. 1E

LEAD MANAGEMENT IN MULTI-TIERED SALES ORGANIZATIONS

CROSS REFERENCE TO RELATED APPLICATIONS

This application claims the benefit of provisional U.S. patent application Ser. No. 60/528,159, filed Dec. 9, 2003, which is hereby incorporated by reference in its entirety.

TECHNICAL FIELD

The following disclosure relates generally to providing automated assistance to sales organizations, and more particularly to assisting multi-tiered sales organizations in managing sales leads, such as to facilitate qualification of sales leads by users in a first group and to facilitate rejection or further processing of qualified sales leads by users in a second group.

BACKGROUND

Many sales organizations use computing systems to assist their sales-related activities in various ways, such as to manage schedules of salespeople and to track sales-related information. For example, some such sales organizations (whether independent entities or the sales-related capability of a larger organization) may track information about known contacts (e.g., individuals and/or groups with which the sales organization has a pre-established relationship, such as based on prior sales or other interactions with that contact), about defined accounts (e.g., individuals and/or groups with which the sales organization has established billing/payment mechanisms, such as based on prior sales), about specific sales opportunities (e.g., identifications of specific quantities and/or revenue corresponding to specific items that a specific contact/account is considering purchasing, such as by a specific close date and with a specific likelihood of purchase and/or specific degree of interest), and about sales prospects that might lead to sales opportunities (e.g., a name of a person that might have some interest in one or more items available via the sales organization). In addition, some sales organizations may use computer-telephony-integration ("CTI") capabilities to facilitate interacting with customers and/or potential customers via phone.

Some sales organizations are referred to as single-tiered organizations, in that a single sales-related individual (e.g., one of a group of individuals that all perform the same types of tasks) performs all activities related to interacting with a group of sales prospects in order to identify specific sales opportunities and to produce actual sales from those sales opportunities. Conversely, other sales organizations are referred to as being two-tiered organizations, in that a first group of sales development individuals (e.g., telemarketers) perform some initial activities related to sales prospects, such as to gather basic contact information and/or to assess some information about the potential sales interests of the prospects, while other salespeople later attempt to produce actual sales from at least some of those prospects.

However, various problems arise in such two-tiered organizations. For example, the first-tier sales development individuals may not perform sufficient processing related to prospects to enable the second-tier salespeople to efficiently perform their tasks, such as by not gathering sufficient information related to the prospects and/or by forwarding prospects to salespeople that do not have a sufficiently high likelihood of resulting in a specific sales opportunity. In addition, even if the first-tier sales development individuals are given specific instructions as to the tasks that they are to perform, such instructions may not be followed by all sales development individuals or in all situations, such as when the sales development individuals receive incentives (e.g., a financial incentive for each prospect forwarded to a salesperson and/or a requirement to forward a minimum number of prospects to salespeople) that lead them to not adequately follow the instructions. Moreover, it can often be difficult to remedy such problems, as the second-tier salespeople may not know which first-tier sales development individuals are causing problems with specific prospects, or it may instead be difficult or impossible for a second-tier salespeople to provide appropriate feedback in a meaningful way, such as to minimize or eliminate future occurrences of similar problems.

Accordingly, it would be beneficial to provide automated processing that manages sales-related activities so as to enforce defined types of processing and to allow problems that occur to be easily remedied, such as for multi-tiered sales organizations. In addition, it would be beneficial to provide such automated sales-related processing in a manner that benefits multiple unrelated sales organizations, such as by hosting a network-accessible service that provides such automated processing to multiple sales organizations that are clients of the service.

BRIEF DESCRIPTION OF THE DRAWINGS

FIGS. 1A-1F illustrate example user interface screens of a system that automatically provides various described sales-related capabilities to one or more two-tiered sales organizations.

DETAILED DESCRIPTION

Figure 1A:
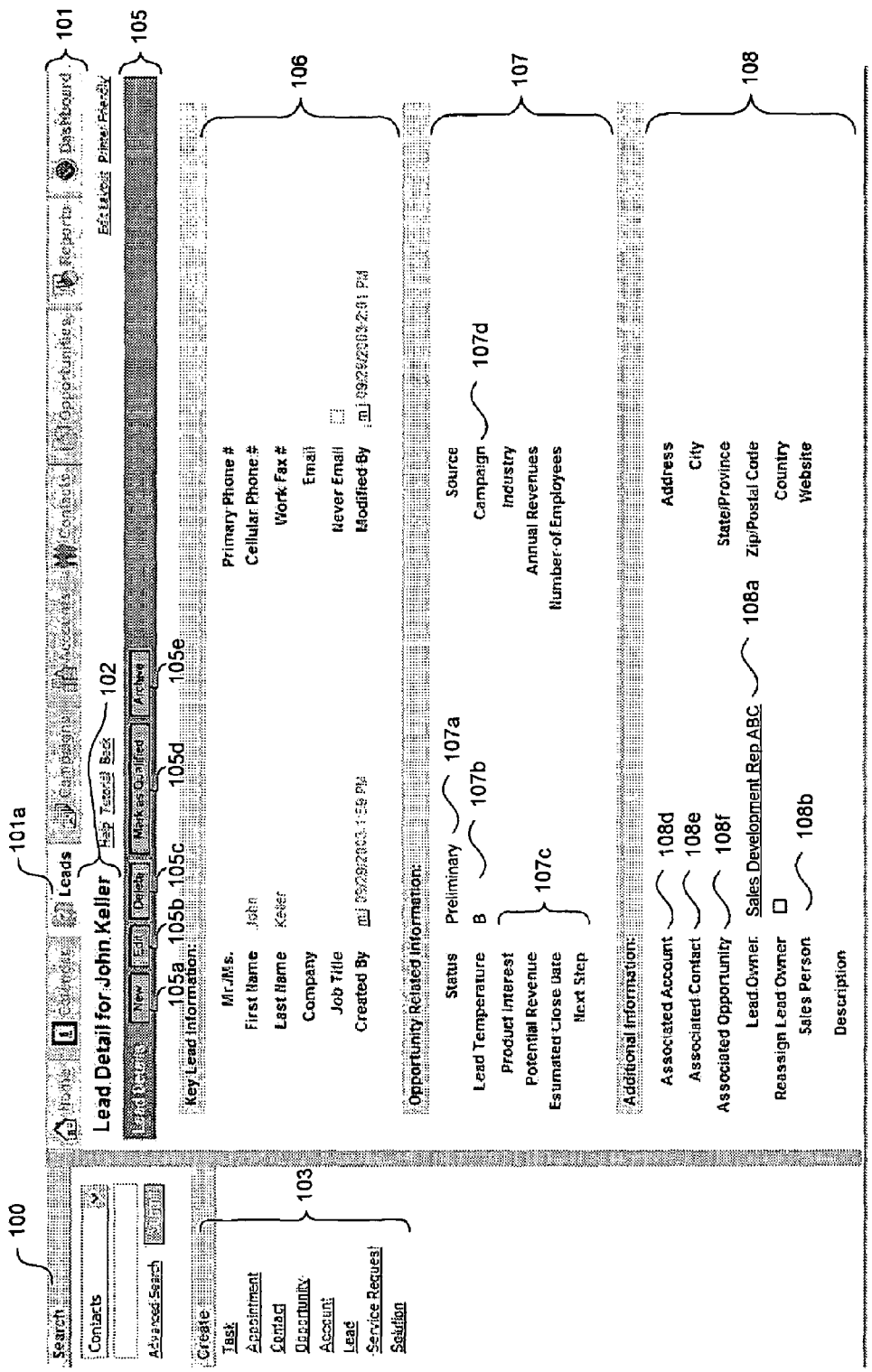

A software facility is described below that provides automated assistance to sales organizations in managing sales leads and in performing other sales-related activities, such as for two-tiered and other multi-tiered sales organizations. In some embodiments, the automated assistance includes managing sales leads by assisting a first tier of sales development representatives to qualify sales leads as being sufficiently developed to allow a second tier of sales representatives to efficiently attempt to produce sales from those qualified sales leads (e.g., based on defined criteria for that sales organization), and by further assisting the second-tier sales representatives not only in their sales efforts but also to provide meaningful feedback that addresses problems occurring in the sales lead qualifying process (e.g., by notifying a first-tier sales development representative of the reasons that one of their qualified sales lead was rejected by a second-tier sales representative and prompting action by that sales development representative to resolve the problems corresponding to those reasons). In addition, in some embodiments the automated assistance is provided to multiple unrelated sales organizations via one or more multi-tenanted network-accessible servers that host the sales lead management service to the multiple sales organizations as clients of the service.

In particular, in some embodiments the facility assists the first-tier sales development representatives in various ways, such as to enforce that preliminary unqualified sales leads meet specified criteria (e.g., criteria previously defined by the sales organization to which the sales development representative belong) before they can be qualified. For example, in some embodiments the specified criteria may include a minimum set of information gathered for and associated with a preliminary sales lead, and/or may include a potential and/or likely assessed value corresponding to a preliminary sales lead that meets a specified qualification threshold, such as for a current sales opportunity and/or long-term sales potential. Such assessed values may be determined in various ways and using various factors in different embodiments, such as based on potential revenue resulting from sales to a person and/or organization associated with the sales lead (e.g., within a specified period of time, such as a current sales period), on a likelihood or probability that such sales with result in the potential revenue, on specific items that would be included in such sales, on a current degree of interest of the person/organization in proceeding, etc. Furthermore, such assessed values may be calculated and/or specified in automated and/or manual fashions in various embodiments.

In addition, in some embodiments the facility assists the second-tier sales representatives in various ways, such as to enforce that qualified sales leads meet specified criteria (e.g., criteria previously defined by the sales organization to which the sales representative belong) before a specific sales opportunity can be created based on that qualified sales lead, such as limit the tracking/forecasting activities by the sales organization of sales opportunities for a current sales period to only sales opportunities that are sufficiently likely to occur. For example, in some embodiments such specified sales opportunity-creation criteria may include a likely assessed sales opportunity value that reaches a specified opportunity-creation threshold. As with sales lead qualification criteria, such opportunity-creation criteria may be determined in various ways and using various factors in different embodiments, including being calculated and/or specified in automated and/or manual fashions.

In some embodiments, the facility also assists a second-tier sales representative in rejecting qualified sales leads assigned to that sales representative. For example, in some such embodiments the facility may allow the sales representative to provide one or more reasons for the rejection (e.g., the qualified sales lead should not have been qualified due to a lack of necessary information of a specified types and/or due to an insufficiently high assessed value) and/or one or more suggested actions related to the rejected sales lead (e.g., to have the sales development representative that originally qualified the sales lead gather the necessary information before re-qualifying the sales lead and/or to take appropriate action so that that sales development representative does not qualify other sales leads with insufficiently high assessed values in the future). Information about rejected qualified sales leads can be provided to the sales development representatives that originally qualified those sales leads and/or to other users as appropriate (e.g., to a supervisor of the sales representative and/or the original sales development representative for informational purposes or to spur corrective manual intervention, and/or to an administrative user for the sales organization to adjust lead qualifying criteria or capabilities for the original sales development representative or for all sales development representatives). In addition, in some embodiments the facility may take automated action of various types based on one or more rejected qualified sales leads, such as to adjust lead qualifying criteria or capabilities for the original sales development representative or for all sales development representatives.

In some embodiments, the facility assists in managing the lead qualification process by presenting information and capabilities to users that are appropriate for those users. For example, the facility may determine a current role for each user, such as based on their position in a sales organization's hierarchy and/or based on their position (e.g., sales development representative or sales representative) within the sales organization, and may use information about a user's role and the organization to which they belong to control information and capabilities provided to that user. Such control of information and capabilities based on role and/or organization can be performed in various ways, such as based on the information accessible to be displayed to a user via a graphical user interface ("GUI") of the facility and/or based on controls of the GUI that are selectable by the user.

In addition, in some embodiments the facility may allow each sales organization that is using the capabilities of the facility to customize some or all types of information and/or capabilities made available to users of that sales organization, such as based on user roles defined for that sales organization, as well as to customize criteria and define other processing steps corresponding to handling of leads. For example, for leads which have been archived by a sales development representative based on a determination that the lead is not currently of sufficiently high value to forward to a sales representative for further processing, a sales organization may be able to define what types of actions are allowed for such archived leads (e.g., transform the archived lead to a preliminary unqualified sales lead and/or to a qualified sales lead, create a sales opportunity based on the archived lead, etc.) and/or which users are allowed to performed specified actions (e.g., only the user that archived the lead, any user of a specified role, and user having specified access or authorization privileges, etc.). Furthermore, in some embodiments such customizations are allowed for multiple unrelated sales organizations whose users may simultaneously be using a single instance of the facility, such as when the facility instance is executed on one or more multi-tenanted network-accessible servers that host the sales lead management service to the multiple sales organizations as clients of the service.

For illustrative purposes, some embodiments of the software facility are described below in which specific types of capabilities and information is provided to specific types of users in specific ways, and in which specific types of processing is performed for sales leads. However, those skilled in the art will appreciate that the techniques of the invention can be used in a wide variety of other situations, and that the invention is not limited to use with the specific capabilities, information and users, or to use with sales leads. In addition, as used herein, "sales" and "purchases" of "items" are understood to refer to any financial relationship which distinct entities interact to obtain products and/or services, including leasing, renting, licensing, bartering, borrowing, purchasing, loaning, etc.

FIGS. 1A-1F illustrate example GUI screens provided by an embodiment of the facility to assist users of a two-tiered sales organization to manage sales leads. In particular, FIG. 1A shows an example screen 100 that assists a user in managing preliminary unqualified sales leads. In this example, the screen is displayed to a user ABC who is currently acting in the role of "sales development representative" for a sales organization. As is shown, the screen 100 includes numerous tabs 101 along the top of the screen that each correspond to a type of information and/or functionality that is available to the user, with the "Leads" 101a tab currently selected to provide lead-related information to User ABC.

In this example embodiment, User ABC's role as a sales development representative puts User ABC in a tier of the sales organization that is responsible for processing preliminary sales leads in order to determine whether they are of sufficient potential value to qualify those sales leads for further development by another user whose role within the sales organization places them in a different tier. Thus, a variety of user-selectable controls 105 are displayed to User ABC based on their role and their current context, which in the example is a detail page for a particular preliminary sales lead assigned to User ABC, as shown by information 102. While not illustrated here, this lead detail screen may have been reached by, for example, first displaying to User ABC a list of multiple preliminary leads assigned to the user, and then displaying the illustrated screen 100 in response to selection by User ABC of the current sales lead.

As is shown, the detail information is for a sales lead corresponding to an individual with the name "John Keller," and section 106 of the screen provides data fields to display various information about the lead (e.g., contact information). Section 107 of the screen includes data fields for additional information related to the sales lead that affects a potential value of the preliminary lead to the sales organization, including a lead "temperature" or level of interest 107b, information 107c related to a potential product sales opportunity based on the lead, an indication of any related sales campaign 107d that generated the lead, and a variety of other information. Status information 107a shows that the sales lead is currently a preliminary unqualified sales lead.

The screen 100 also includes a section 108 of other administrative information related to the current sales lead, such as to indicate the current assignment 108a of the lead to User ABC as well as a data field 108b to show a "sales representative" user to whom a corresponding qualified lead is assigned for further development (which is currently blank due to such a corresponding qualified sales lead not yet existing). Other administrative information includes any defined accounts 108d for the sales organization to which the lead corresponds, any defined contacts 108e within the sales organization to which the lead corresponds, and any defined sales opportunities 108f within the sales organization to which the lead corresponds.

While most of the displayed information fields for the lead are currently blank based on the status of the preliminary sales lead as being recently created and not yet qualified, many or all of the fields will be populated by the users and/or automatically as the lead progresses through the lead management processing defined for the sales organization. For example, as User ABC gathers various information about the lead, such as contact information, the user can select the "Edit" control 105b in order to modify data fields as appropriate. In some embodiments, the user can similarly use controls 105a and 105c to create new sales leads and to delete defined sales leads as appropriate, such as if the user identifies new leads based on telemarketing activities conducted as part of their role or if an existing sales lead was mistakenly added to the system (e.g., was duplicative of another existing sales lead) and thus should be deleted. Screen 100 also includes a section 103 with which User ABC can quickly create new instances of various defined data structures for the system, including preliminary sales leads and sales opportunities.

After User ABC gathers sufficient information to perform a preliminary assessment of the potential value of the preliminary sales lead to the sales organization, in the illustrated embodiment the user makes a manual decision as to whether the potential value is sufficiently high to qualify the lead and thus cause it to be assigned to a sales representative for further development. If so, User ABC selects the lead qualifying control 105d in order to alter the preliminary sales lead so as to create a corresponding qualified sales lead. If so, the system in the illustrated embodiment automatically assigns the new qualified sales lead to an appropriate sales representative (e.g., based on customized assignment processing defined by the sales organization to which the users belong), and provides the qualified sales lead to that sales representative for further development. Conversely, if User ABC determines that the preliminary sales lead does not have a sufficient likely value to warrant further pursuit at the current time, User ABC can instead select the "Archive" control 105e to remove the preliminary sales lead from currently active status, which in the illustrated embodiment will cause the archived sales lead to no longer be displayed by default to User ABC as part of their list of current preliminary sales leads.

FIG. 1B illustrates an example of at least some of the revisions that would occur to screen 100 if User ABC had qualified the preliminary sales lead illustrated in FIG. 1A by using the qualifying control 105d. In particular, the status 107a of the lead has been changed to show that the sales lead is now a qualified sales lead, and field 108b illustrates that the qualified sales lead has now been assigned to a sales representative user for further development, who in this case is User DEF. In the illustrated embodiment, an option 108c also is now displayed with which a user can request or specify that the current owner of the sales lead be reassigned, such as if another sales development representative user would be more appropriate for the sales lead. In addition, in the illustrated embodiment the associated lead temperature 107b for the qualified sales lead has now been revised, such as to reflect a default temperature for all new qualified sales leads, to reflect information manually specified by User ABC prior to the user's selection of the qualifying control (e.g., if required to allow the qualifying to occur), to reflect a new temperature automatically assigned based on other information available to the system regarding the lead, etc.

In addition, in the illustrated embodiment, the user-selectable controls 105 have changed based on the new context of the current sales lead, and in particular the qualifying control 105d is no longer displayed as it is inappropriate for a qualified sales lead. In other embodiments, all the possibly relevant controls could instead continue to be displayed and available, or the use of an accessible but inappropriate control could instead be restricted in other ways (e.g., by displaying the control in a shaded manner and not allowing it to be selected by the user).

While not illustrated here, in some embodiments the qualifying of sales leads will be restricted based on predefined criteria, such as one or more predefined thresholds (e.g., for the lead temperature and/or a manually or automatically assessed potential value corresponding to the lead). If so, in such embodiments User ABC may not be allowed to qualify a lead until such criteria are satisfied, such as by disabling the qualifying control in a manner previously discussed or instead by providing an error message when an inappropriate qualifying selection attempt is made by User ABC. In some such embodiments, such criteria may be predefined in a customized manner by User ABC's sales organization, such as by an administrative user for the sales organization, while in other such embodiments some or all such criteria may instead be system-provided defaults and/or non-modifiable system constants.

FIG. 1C illustrates a screen 110 for sales representative User DEF that assists in developing qualified leads that have been assigned to the user. In the illustrated embodiment, screen 110 is similar to the screen 100 displayed to User ABC, including having information 102 describing the screen contents, various user-selectable controls 105 related to sales leads, user-selectable controls 103 to create new data item instances within the system, and various lead-related information 106-108. However, in the illustrated embodiment the controls 105 displayed to User DEF differ from those previously displayed to User ABC based both on the different role of User DEF and on the different context of developing a qualified sales lead. In particular, User DEF is presented with new controls "Convert" 105f and "Reject" 105g. In the illustrated embodiment, the user continues to be displayed an Edit control 105b and Archive control 105e, but in the illustrated embodiment is not provided with controls New 105a, Delete 105c and a qualifying control 105d. In other embodiments, the Archive control may instead not be displayed, and/or one or more of the non-provided controls 105a, 105c, and 105d may be displayed.

If User DEF determines in the illustrated embodiment that a newly assigned qualified sales lead should not have been qualified, the user can select the Reject control 105g to remove that sales lead as a currently active qualified sales lead for the user. In some embodiments, the rejected qualified sales lead will revert back to a preliminary unqualified sales lead, and will be returned to the prior sales development representative user (in this case User ABC) for the purposes of feedback and/or to gather additional relevant information before the sales lead is re-qualified.

Alternatively, if User DEF determines in the illustrated embodiment that the qualified sales lead has an assessed likely value that is sufficiently high to warrant creating a corresponding sales opportunity, User DEF can select the Convert control 105f to create a sales opportunity based on the qualified sales lead, such as by converting information associated with the lead into a form associated with the new opportunity. In the illustrated embodiment, converted sales leads are removed from active status for the sales representative to which they were assigned, such as to remove them from a list of currently active qualified sales leads that may be displayed to the user. In addition, in some embodiments conversion to a sales opportunity includes determining an appropriate user to further pursue the sales opportunity, which in some embodiments may be a user with yet another distinct role within a multi-tiered sales organization, while in other embodiments may continue to be a sales representative user (e.g., the current user to whom the qualified sales lead was assigned). As with the qualifying process for preliminary sales leads, in some embodiments the system may use various criteria and/or thresholds to define when and how a qualified sales lead can be converted to a sales opportunity, and if so such defined processing may be enforced via the functionality provided to the sales representative user in various ways.

Figure 1D:
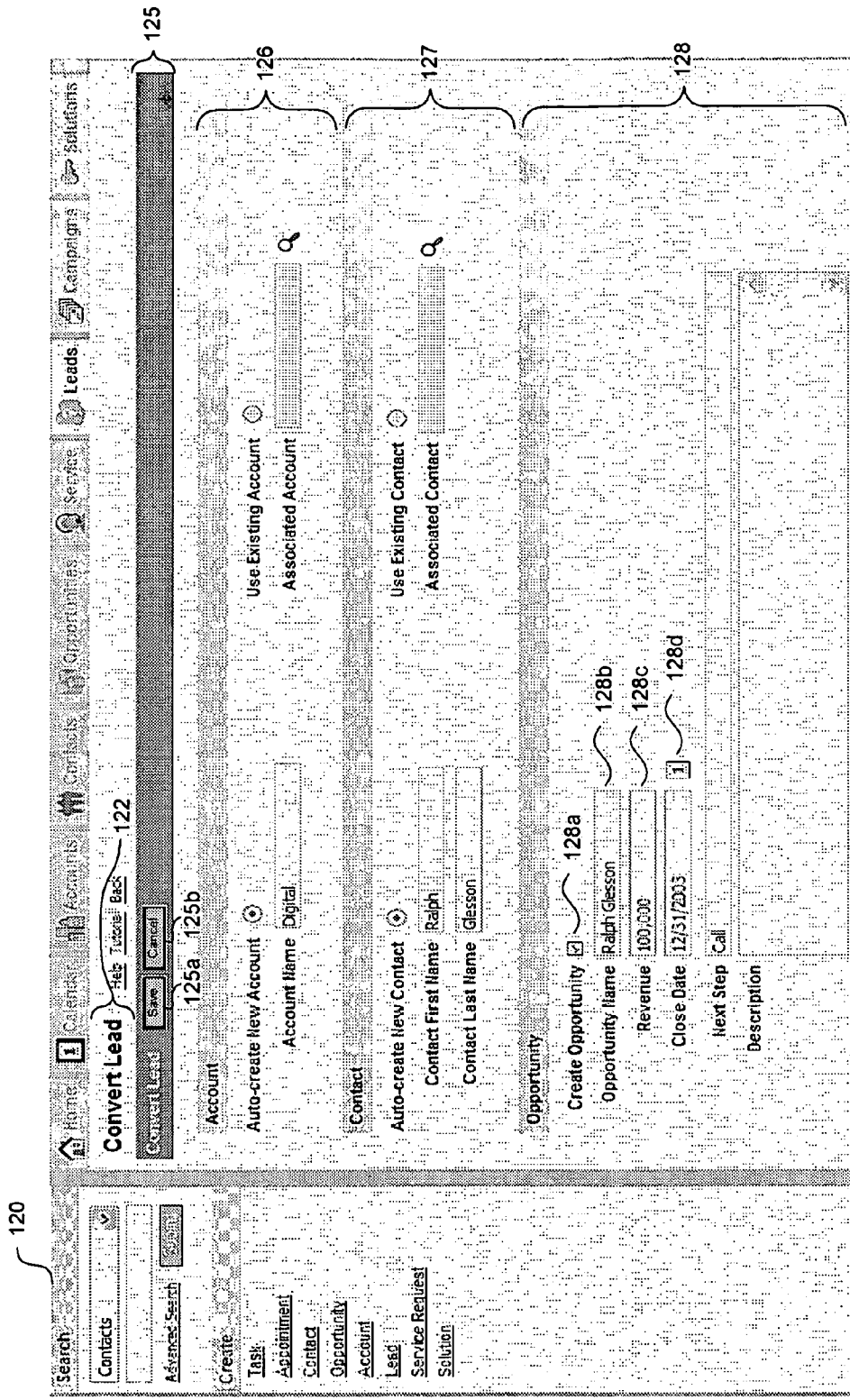

FIG. 1D illustrates an example screen 120 that is displayed to sales representative User DEF after the user has selected the Convert control for a different qualified sales lead assigned to that user. The screen 120 includes information 122 indicating the context of the screen, and various user-selectable controls 125, which in the illustrated embodiment include a Save control 125a and a Cancel control 125b. In addition, in the illustrated embodiment each qualified sales lead that is converted to a sales opportunity is further associated with at least one defined account within the system and at least one defined contact within the system for the sales organization. Thus, the screen includes a section 126 with which User DEF can specify various account-related information for the sales lead, and a section 127 with which User DEF can specify various contact-related information for the sales lead.

In addition, the screen 120 includes a section 128 that includes various opportunity-related information corresponding to the qualified sales lead. In particular, in the illustrated embodiment the section 128 includes a field 128b that holds the name for the opportunity, a field 128c that holds projected or estimated revenue corresponding to the opportunity, and a field 128d which includes a projected or estimated close date for the sale corresponding to the opportunity—in some embodiments, some or all such information may be required for each opportunity. In addition, in the illustrated embodiment the section 128 includes a user-selectable control 128a with which User DEF can specify to create a new sales opportunity for the qualified sales lead being converted, such as if a corresponding opportunity data item instance did not already exist within the system for the sales organization. As previously noted, in the illustrated embodiment the conversion to sales opportunity process will include having the sales opportunity assigned to an appropriate user within the sales organization to pursue the opportunity.

Figure 1E:
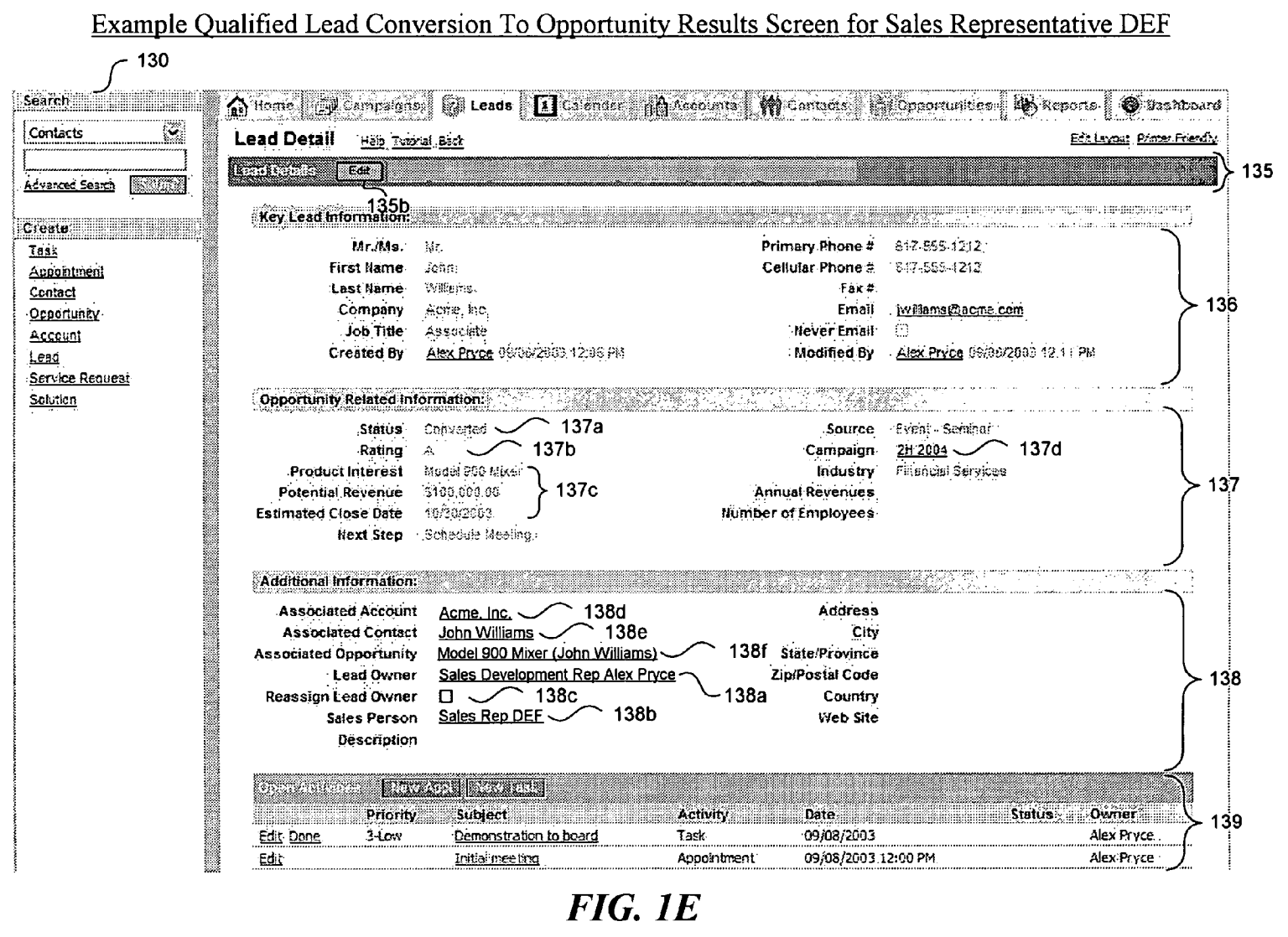

FIG. 1E illustrates an example screen 130 that displays various information to User DEF corresponding to a qualified sales lead that has been converted to a sales opportunity by the user. In particular, in this example embodiment, screen 130 is similar to screens 100 and 110, and includes a section 135 with user-selectable controls, a section 136 with various information related to the sales lead, a section 137 with various information related to the sales opportunity based on the sales lead, and a section 138 with various administrative information related to the sales lead. In addition, in the illustrated embodiment the screen 130 includes a section 139 to indicate activities related to the sales lead, such as previously performed activities prior to the opportunity conversion process and/or additional activities to perform related to the sales opportunity based on the converted sales lead. As is shown, in this example embodiment most or all data fields have been specified by the time the qualified sales lead has been converted to a sales opportunity, including various opportunity-related information 137c and 137d and various administrative information 138a-138f that includes information about the defined account, contact and opportunity instances in the sales organization system for the converted sales lead. In addition, the status 137a of the sales lead has now been altered to show that the sales lead has been converted, and a rating 137b has been assessed to show a potential or likely value for the opportunity corresponding to the sales lead.

Figure 1F:
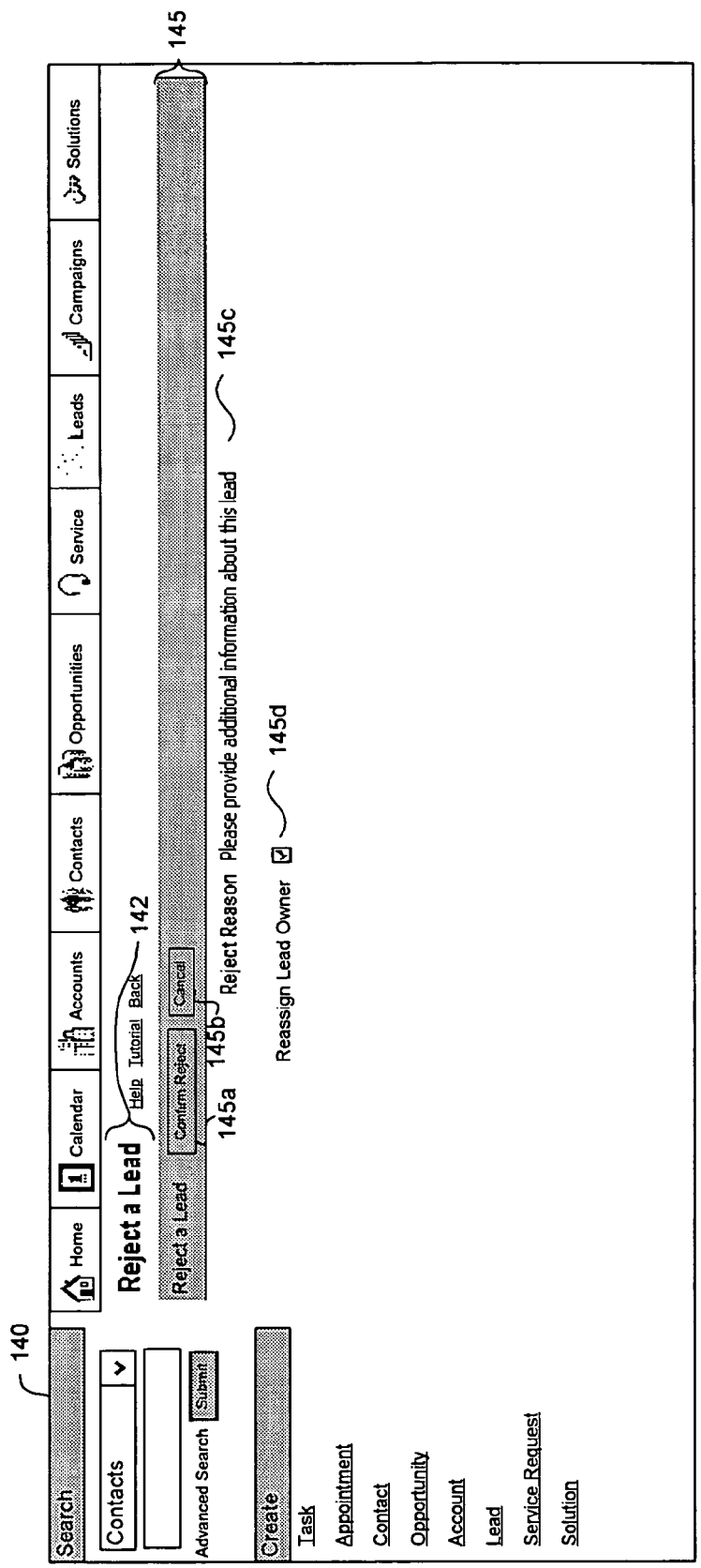

FIG. 1F illustrates an example of a screen 140 that is displayed to User DEF when the user has selected to reject a new qualified sales lead assigned to the user. In particular, screen 140 includes information 142 indicating the context of the screen, and user-selectable controls 145, which include a "Confirm Reject" control 145a and a "Cancel" control 145b. In addition, the screen prompts the User DEF to provide a reason 145c about the rejection of the qualified sales lead, such as to provide feedback to one or more other users to whom the reason and rejection notice will be provided. While not illustrated here, in some embodiments User DEF further may be allowed to specify one or more suggested actions to take with respect to the rejected qualified sales lead, such as to return the sales lead to the sales development representative that qualified the lead for additional processing. The screen 140 in the illustrated embodiment also includes a user-selectable control 145d to specify that the sales lead be reassigned to a new user.

Thus, FIGS. 1A-1F illustrate examples of user interface screens for a system that automatically provides various sales-related capabilities to a two-tiered sales organization, such as to assist in the management of lead qualifying and processing.

Figure 2:
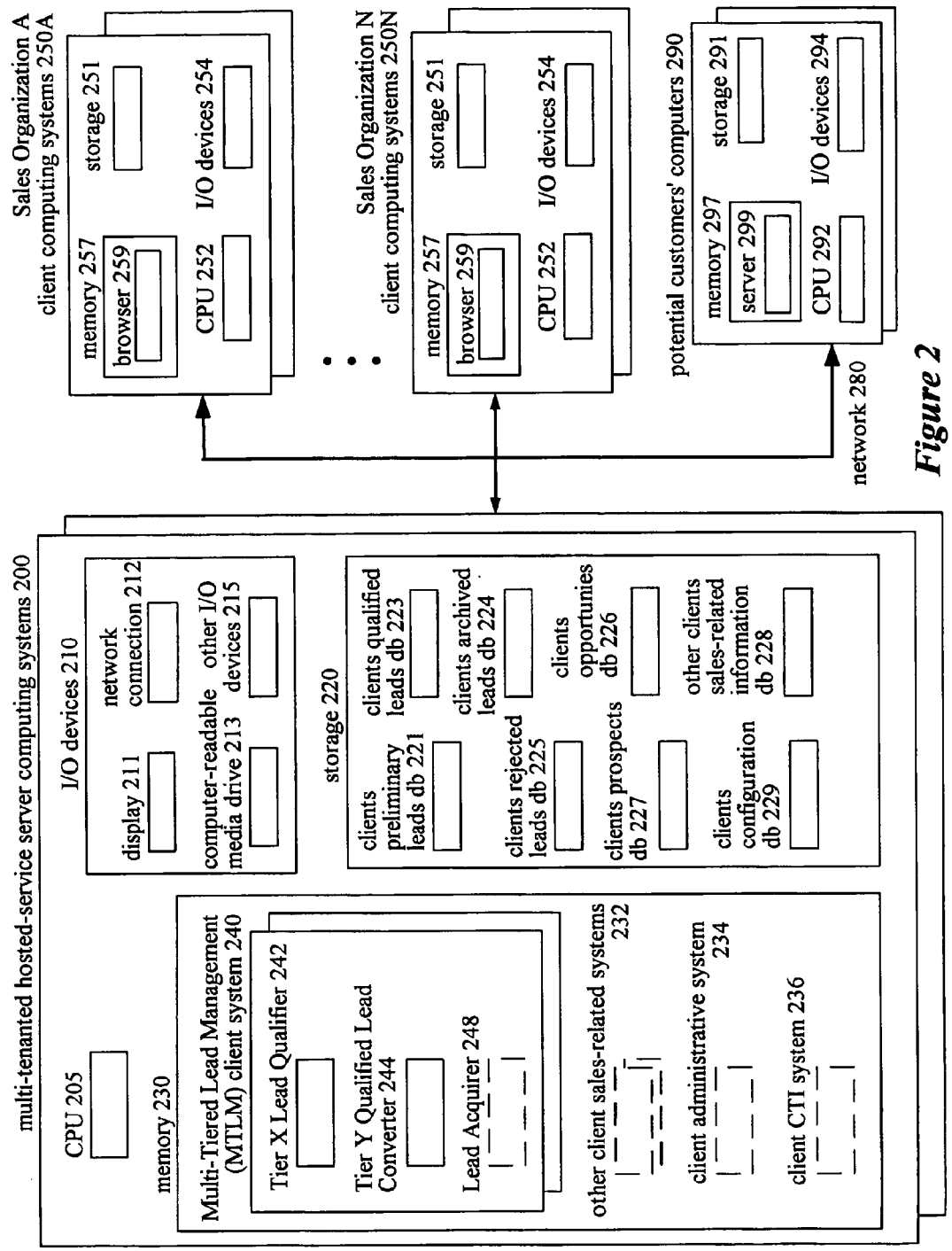
FIG. 2 is a block diagram illustrating an embodiment of a system for automatically providing various described sales-related capabilities to multi-tiered sales organizations as part of a multi-tenanted hosted network-accessible service.

FIG. 2 illustrates server computing system(s) 200 suitable for executing an embodiment of the Multi-Tiered Lead Management (MTLM) system facility 240 as part of a multi-tenanted hosted service, as well as client computing systems 250 from which users of hosted tenant client sales organization can access the MTLM system and computers 290 of potential customers of those sales organizations. The server computing system(s) 200 each include a CPU 205, various I/O devices 210, storage 220, and memory 230. The I/O devices include a display 211, a network connection 212, a computer-readable media drive 213, and other I/O devices 215.

An embodiment of the MTLM system 240 is executing in memory, and it includes a Tier X Lead Qualifier component 242, a Tier Y Qualified Lead Converter component 244, and an optional Lead Acquirer component 248. The functionality of the MTLM system can be accessed in various ways in different embodiments. For example, in the illustrated embodiment, users of client computing systems 250 access the MTLM system remotely via network 280 (e.g., via the Internet and/or the World Wide Web). Such users can use software or other functionality provided on the client computer systems, such as a browser 259 executing in memory 257, to interact with the MTLM system and any other components or services provided on the server computing system(s) 200. In other embodiments, users may obtain functionality and/or information from the MTLM system in other ways, such as directly in those users have physical access to a server computing system (e.g., by interacting with the various I/O devices 210 to provide and/or receive information) and/or indirectly via interactions with one or more other computers (not shown) that may directly receive functionality or information from the MTLM system before providing it to the users. In addition, the MTLM system and any other provided systems/components may provide various feedback or other general types of information to users (e.g., in response to user requests), and this information can be presented to a user in an appropriate manner (e.g., on one of the I/O devices 265 of a client system).

In particular, the MTLM system provides various sales-related capabilities to multi-tiered client sales organizations, such as to assist in the management of lead qualifying and processing. In some embodiments, the server computing system(s) 200 also provide one or more other optional systems executing in memory 230 in order to provide functionality to client computing systems, such as one or more other client sales-related systems 232 (e.g., to manage campaigns and identify prospects, to process prospects in order to identify leads, to process sales opportunities, to provide forecasting capabilities related to sales opportunities, etc.), a client administrative system 234 with which clients can sign up for provided services and manage their administrative and configuration information, and a client CTI system 236 to assist clients in interacting with potential customers in a telephonic manner.

In the illustrated embodiment, the Lead Qualifier component 242 interacts with client system users of a first tier in order to present those users with preliminary unqualified leads and to manage the qualifying process for those leads. In embodiments in which the server computing system(s) host the data for clients, such as in the illustrated embodiment, the component may interact with a clients' preliminary leads database 221 on storage 220 in order to read and write information about preliminary leads (e.g., from a portion of the database specific to that client, or by extracting client-specific data from a shared portion of the database), and with a clients' qualified leads database 223 on storage 220 in order to read and write information about preliminary leads that the component qualifies. In other embodiments, some or all of such data may not be hosted, and instead the component may instead interact with data stored on the client's computing system (e.g., in memory 257 or on storage 251), and/or some or all of the component may execute on the clients' computing system (e.g., in memory 257 in conjunction with CPU 252).

In addition, in some embodiments the component may further interact with the clients' archived leads database 224 on storage 220 in order to read and write information about archived leads (e.g., if the component further provides archiving capability for preliminary leads or retrieval capability for archived leads), with the clients' prospects database 227 on storage 220 in order to read and write information about prospects (e.g., if the component further capabilities for creating preliminary leads from prospects), and with the clients' configuration database 229 on storage 220 in order to read and write information about configuration information for the client (e.g., information about users associated with the client; information about roles of users; information about the organizational structure of the client; information about defined and/or customized processing specific to that client, including criteria related to qualifying of leads; etc.).

Similarly, in the illustrated embodiment, the Qualified Lead Converter component 244 interacts with client system users of a distinct second tier in order to present those users with qualified leads and to manage the process of rejecting those qualified leads and/or of converting those qualified leads into sales opportunities. In embodiments in which the server computing system(s) host the data for clients, such as in the illustrated embodiment, the component may interact with the clients' qualified leads database 223 in order to read and write information about qualified leads, may interact with the clients' rejected leads database 225 on storage 220 in order to read and write information about rejected sales leads created by rejecting qualified sales leads, and may interact with the clients' opportunities database 226 on storage 220 in order to read and write information about sales opportunities created by converting qualified sales leads. In addition, in some embodiments the component may further interact with the clients' archived leads database 224 (e.g., if the component further provides archiving capability for qualified leads or retrieval capability for archived leads), and with the clients' configuration database 229 in order to read and write information about configuration information for the client (e.g., information about defined and/or customized processing specific to that client, including criteria related to rejecting of leads and/or to converting of leads into sales opportunities).

In some embodiments, the optional Lead Acquirer component 248 may be provided to interact with client system users in order to assist those users in acquiring leads, such as by managing sales campaigns and/or by developing sales prospects. In such embodiments, the component may interact with the clients' prospects database 227 in order to read and write information about prospects, with the clients' configuration database 229 in order to read and write information about configuration information for the client, and/or with the other clients' sales-related information database 228 on storage 220 in order to read and write information about other types of sales-related information (e.g., campaigns). Similarly, in embodiments in which one or more of the optional systems 232-236 are provided and used, those systems may similarly interact with one or more of the databases 221-229 (e.g., the other clients' sales-related information database 228 and the clients' configuration database 229). As the various components and systems interact with the client system users, the components/systems may further in some embodiments and situations interact with computers 290 of potential customers of those clients or with computers (not shown) of actual customers in order to exchange customer-related information and/or to provide functionality to those customers.

Those skilled in the art will appreciate that computing systems 200, 250 and 290 are merely illustrative and are not intended to limit the scope of the present invention. Computing system 200 may be connected to other devices that are not illustrated, including through one or more networks such as the Internet or via the World Wide Web. More generally, a "client" or "server" may comprise any combination of hardware or software that can interact in the manners described, including computers, network devices, internet appliances, PDAs, wireless phones, pagers, electronic organizers, television-based systems and various other consumer products that include inter-communication capabilities. In addition, while systems interact over the Internet in the illustrated embodiment, the techniques of the MTLM system can be used in various environments other than the Internet (e.g., via email or instant messaging). In addition, the functionality provided by the illustrated MTLM system components may in some embodiments be combined in fewer components or distributed in additional components. Similarly, in some embodiments the functionality of some of the illustrated components may not be provided and/or other additional functionality may be available. For example, in some embodiments different types of data may be stored and/or the illustrated types of data may be stored in other manners, such as to provide separate databases for each client and/or to store prospects together with preliminary leads (e.g., if prospects are not tracked separately from such leads).

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the MTLM system components or data structures may also be stored (e.g., as instructions or structured data) on a computer-readable medium, such as a hard disk, a memory, a network, or a portable article to be read by an appropriate drive. The MTLM system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 3:
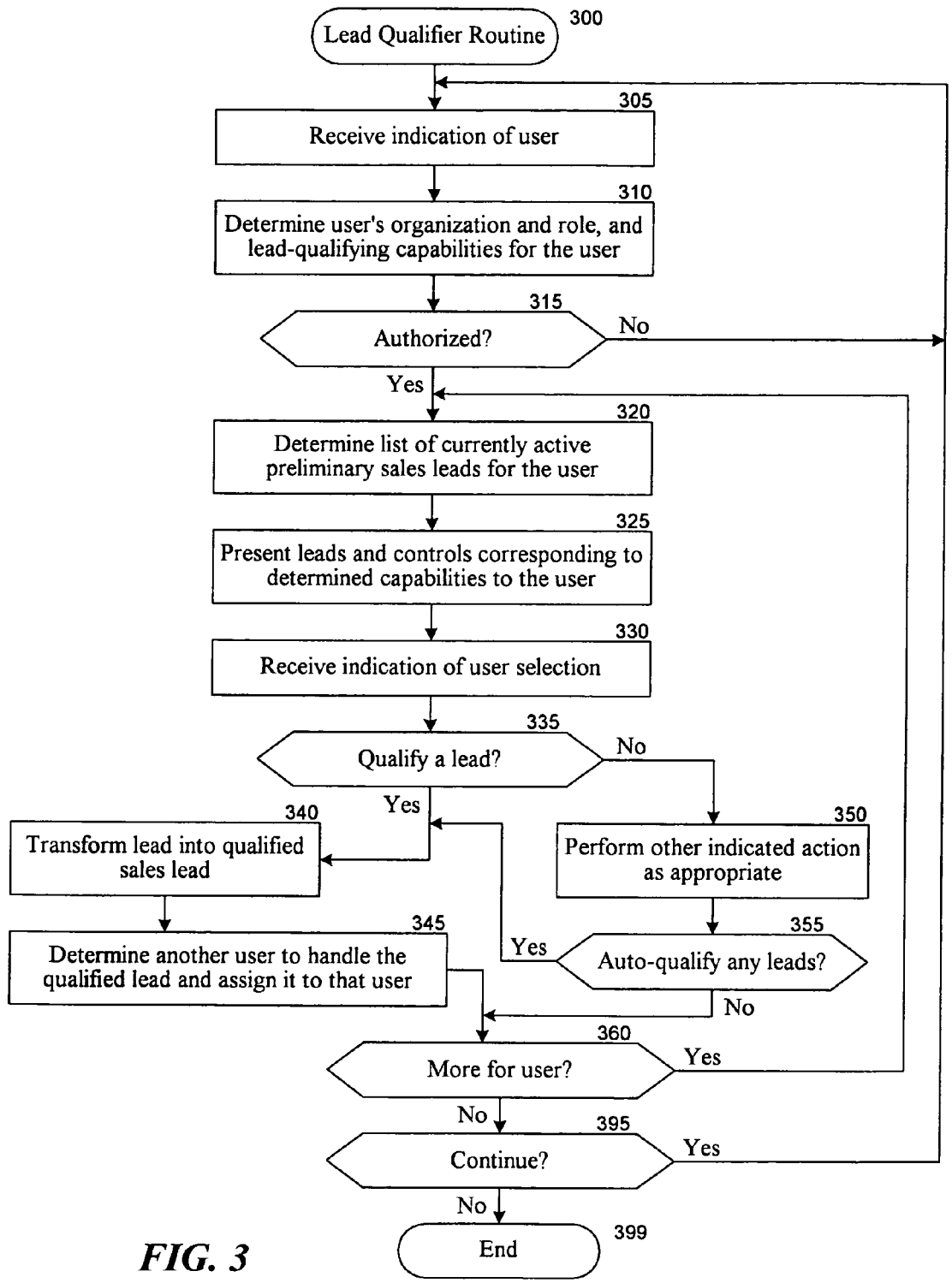
FIG. 3 is a flow diagram of an embodiment of the Sales Lead Qualifier routine.

FIG. 3 is a flow diagram of an embodiment of the Lead Qualifier routine 300. The routine is performed for users whose role within a sales organization includes activities related to qualifying preliminary sales leads (e.g., sales development representatives), and includes providing capabilities to the users as appropriate to manage a defined process of handling the preliminary sales leads.

The routine begins at step 305, where an indication is received of a user. The routine continues at step 310 to determine the sales organization to which the user belongs, the user's role within the sales organization, and any defined lead-qualifying capabilities for the user based on previously defined information for the user and/or the role and/or the organization. The routine then continues to step 315 to determine whether the user is authorized to receive information about preliminary sales leads that need to be qualified, and if not returns to step 305. In other embodiments, such a authorization step may not be performed, or it may instead be based on other types of information (e.g., an appropriate password or other security information provided by or for the user).

If it was determined in step 315 that the user is authorized, the routine continues to step 320 to determine a list of preliminary unqualified sales leads that are currently active and are assigned to the user, and in step 325 the routine presents some or all of the leads to the user along with indications of user-selectable controls corresponding to capabilities available to the user with respect to the leads. For example, in some embodiments a list of assigned preliminary sales leads may be displayed to the user as part of a GUI along with displayed indications of the controls (e.g., via buttons and/or menus), while in other embodiments the information and capabilities corresponding to the controls may instead be provided in other manners (e.g., via an audio interface).

The routine continues to step 330, where an indication is received of a selection made by the user. In step 335, the routine determines whether the user has manually indicated to qualify one of the preliminary sales leads, such as based on information previously gathered by the user for the sales lead and/or based on automatically provided or generated information. If so, the routine continues to step 340 to transform the preliminary sales lead into a qualified sales lead, such as by creating an instance of a new data structure corresponding to qualified sales leads and/or by setting an appropriate flag for the preliminary sales lead data item instance that corresponds to a qualification status. While not performed in the illustrated embodiment, in other embodiments additional automated verification may be performed in order to determine whether to allow a user to qualify a preliminary sales lead, such as to determine whether the sales lead and/or its qualifying satisfy predefined criteria. After step 340, the routine continues to step 345 to determine another user to whom the qualified sales lead will be assigned, such as based at least in part on a role of that other user that is different from the role of the current user, and the routine then assigns the qualified sales lead to that determined user.

If it was instead determined in step 335 that the user selection was not to qualify a lead, the routine continues instead to step 350 to perform another indicated action as appropriate. For example, in some embodiments such indicated actions may include associating information with a preliminary sales lead that was gathered by the user, archiving a preliminary sales lead such that it no longer has an active status, retrieving an archived sales lead for review and/or for qualifying and/or converting to a sales opportunity, etc. In addition, after some or all such actions, in some embodiments the routine may perform various types of calculations or determinations automatically, such as to assess a current potential value of a sales lead based on information provided by the user, and/or may perform verification steps to ensure that such an action is allowed under the defined processing for the user and the user's organization.

In the illustrated embodiment, after step 350 the routine continues to step 355 to determine whether to perform an automated qualification of a preliminary sales lead, such as based on an action performed in step 350 related to that sales lead, and if so continues in step 340. In some other embodiments, automated qualification of preliminary sales leads may not be performed, while in other embodiments only automated sales leads qualifications may be performed. After step 345, or if it was instead determined in step 355 not to perform an automated qualification of a sales lead, the routine continues to step 360 to determine whether to perform additional interactions with the user. If so, the routine returns to step 320, and if not the routine continues to step 395 to determine whether to continue with respect to other users. If so, the routine returns to step 305, and if not the routine continues to step 399 and ends.

While the routine has been illustrated here as being performed for a single user at a time in a serial manner, those skilled in the art will appreciate that in other embodiments the routine may instead simultaneously support multiple users (e.g., from multiple distinct sales organizations), such as when the routine is performed by a system in a multi-tenanted hosted environment in which lead management services are provided to multiple client sales organization, or that instead multiple instances of the routine could be executed simultaneously on one or more computing systems to allow multiple users to simultaneously interact with the provided functionality.

Figure 4:
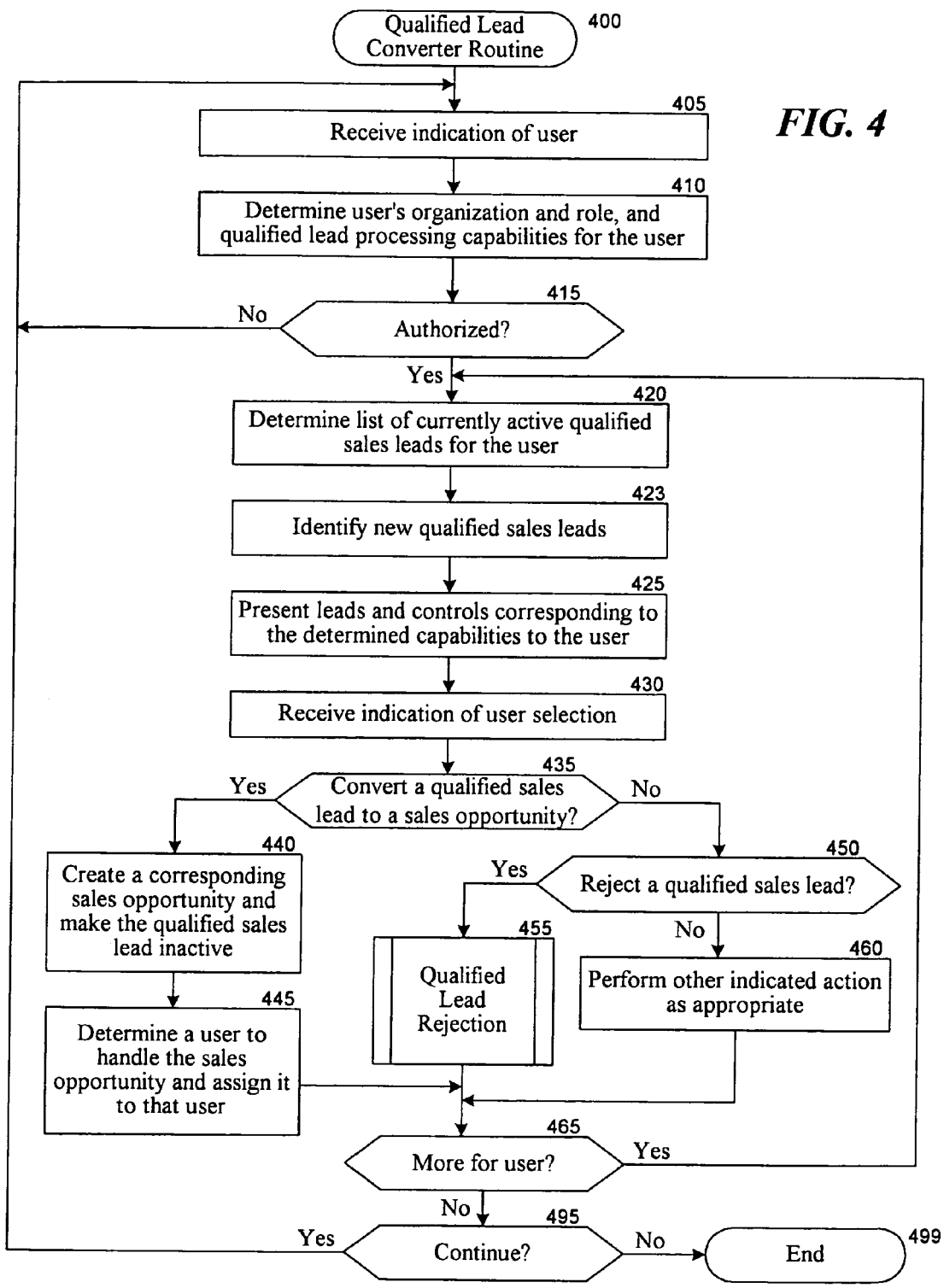
FIG. 4 is a flow diagram of an embodiment of the Qualified Sales Lead Converter routine.

FIG. 4 is a flow diagram of an embodiment of the Qualified Sales Lead Converter routine 400. The routine is performed for users whose role within a sales organization includes activities related to developing qualified sales leads (e.g., sales representatives), and includes allowing qualified sales leads to be converted into sales opportunities or to be rejected as appropriate.

The routine begins at step 405, where an indication is received of a user. The routine continues at step 410 to determine the sales organization to which the user belongs, the user's role within the sales organization, and any defined qualified lead processing capabilities for the user based on previously defined information for the user and/or the role and/or the organization. The routine then continues to step 415 to determine whether the user is authorized to receive information about qualified sales leads, and if not returns to step 405. In other embodiments, such a authorization step may not be performed, or it may instead be based on other types of information (e.g., an appropriate password or other security information provided by or for the user).

If it was instead determined in step 415 that the user is authorized, the routine continues to step 420 to determine a list of qualified sales leads that are currently active and that are assigned to the user. In step 423, the routine then identifies those qualified sales leads that are new for the user, such as those that the user has not yet reviewed or modified, or instead those that have been assigned within a specified prior amount of time. In the illustrated embodiment, the identification of new qualified sales leads is performed in order to be able to highlight those qualified sales leads for the user and to allow the user to reject qualified sales leads that are newly assigned to the user, but in other embodiments such new lead identification functionality may not be provided (e.g., if the user can reject any qualified sales lead regardless of whether it is newly assigned, and/or if date or other information associated with qualified sales leads allows the user to easily identify newly assigned qualified sales leads without system-provided highlighting). After step 423, the routine continues to step 425 to present to the user the list of determined qualified sales leads (performed in the illustrated embodiment in such a manner as to highlight the new qualified sales leads to the user), with user-selectable controls corresponding to the determined capabilities for the user also provided. As with preliminary sales leads, the presentation of qualified sales leads to the user can be performed in various ways, including by displaying to the user a graphical user interface that includes indications of the qualified sales leads and of the controls.

After step 425, the routine continues to step 430 to receive an indication of a selection made by the user. In step 435, the routine determines whether the user selection was to convert a qualified sales lead to a sales opportunity for the sales organization, such as to allow revenue corresponding to the sales opportunity to be tracked and included in sales forecasts for the sales organization. If so, the routine continues to step 440 to create a sales opportunity data item instance corresponding to the qualified sales lead (if such a sales opportunity instance did not exist), such as with populating the instance with appropriate information from the qualified sales lead data item instance or by modifying the qualified sales lead data item instance so that it becomes an opportunity data item instance. In the illustrated embodiment, the created opportunity instance is associated with the qualified sales lead instance, and the qualified sales lead instance is modified so that it is no longer currently active for the user. The routine then continues to step 445 to determine a user to whom the sales opportunity will be assigned for further processing (e.g., another user with a different role within the sales organization from that of the current user, or instead the current user as part of the same role in which they are currently operating), and then assigns the opportunity to that user. In other embodiments, opportunities could be processed in other manners, such as by deleting a qualified sales lead after the opportunity is created.

If it was instead determined in step 435 that the user selection was not to convert a qualified sales lead, the routine continues instead to step 450 to determine whether the user selection was to reject a qualified sales lead, and if so continues to step 455 to perform a qualified lead projection subroutine, as described below with respect to FIG. 5. If it was instead determined in step 450 that the user selection was not to reject a qualified sales lead, the routine continues instead to step 460 to perform another indicated action as appropriate, such as to enter information gathered by the user related to the qualified sales lead, to archive a qualified sales lead, to retrieve a previously archived sales lead, to transform an archived sales lead into a qualified sales lead and/or into a sales opportunity, etc. While not shown in the illustrated routine, in other embodiments the routine could further perform activities to automatically convert and/or reject qualified sales leads as appropriate, such as based on information associated with qualified sales leads by a user and/or based on predefined criteria for such conversion or rejection. Similarly, in some such embodiments, manual conversion and/or rejection of such qualified sales leads may not be performed, or additional processing may be performed after receiving such a manual selection from a user in order to determine whether the indicated conversion or rejection is allowed (e.g., based on predefined criteria).

After steps 445, 455 or 460, the routine continues to step 465 to determine whether to perform additional interactions with the user, and if so returns to step 420. If not, the routine continues to step 495 to determine whether to continue. If so, the routine returns to step 405, and if not the routine continues to step 499 and ends. In a manner similar to that of routine 300, the illustrated routine 400 could be performed in other manners in other embodiments, such as to support multiple users simultaneously interacting with one or more instances of the routine executing on one or more computing systems (e.g., users of multiple client sales organizations in a multi-tenanted environment in which the qualified lead processing is performed as a hosted service).

Figure 5:
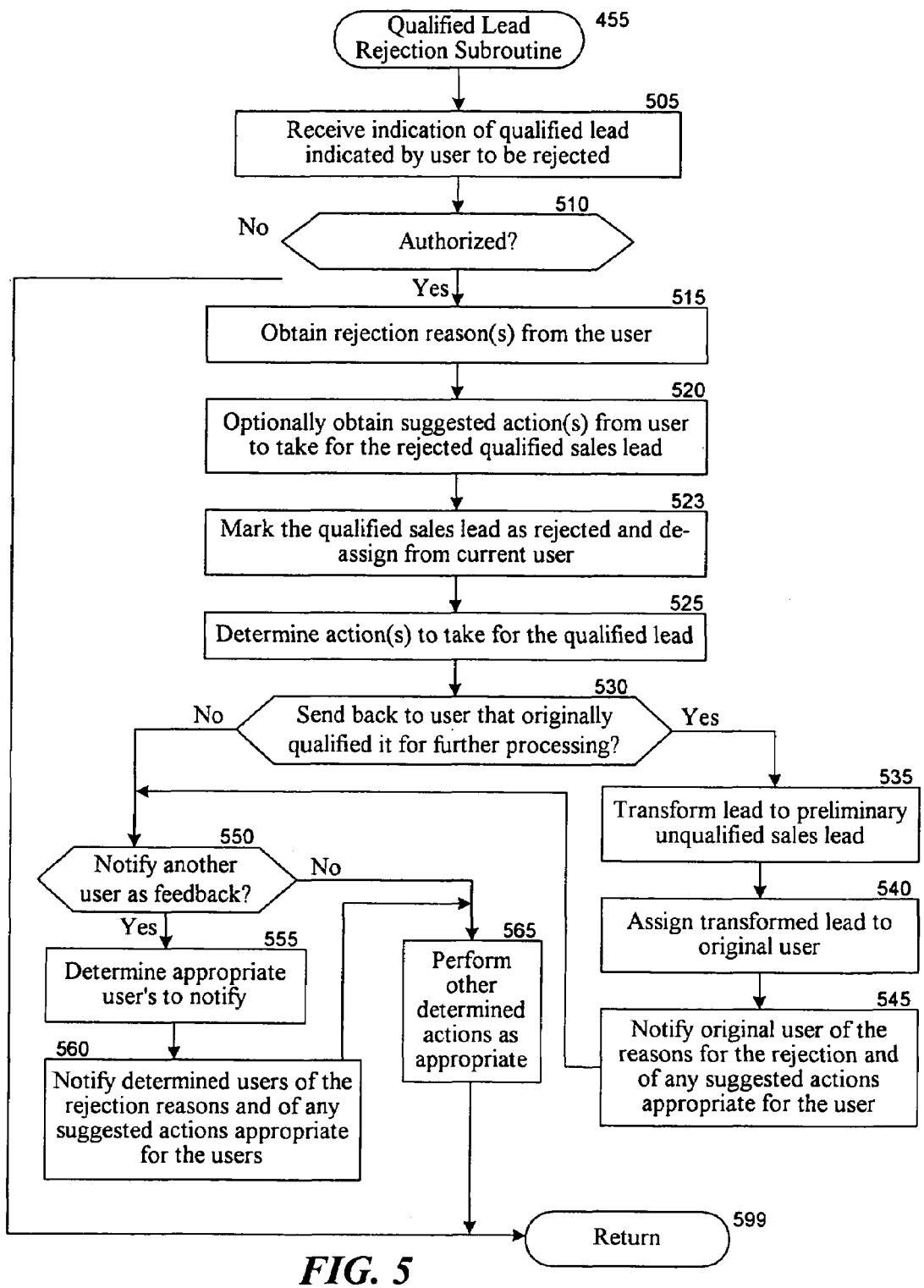
FIG. 5 is a flow diagram of an embodiment of the Qualified Sales Lead Rejection subroutine.

FIG. 5 is a flow diagram of an embodiment of the Qualified Sales Lead Rejection subroutine 455. The subroutine processes a rejection of a qualified sales lead by a user to whom the qualified sales lead has been assigned, such as to provide feedback to other users of the rejection and of a reason for the rejection, and/or to obtain additional information for the sales lead that is needed before it can be re-qualified.

The subroutine begins at step 505 where an indication is received of the qualified sales lead indicated by the user to be rejected. The routine continues to step 510 where it is determined whether the user is authorized to perform the rejection of the qualified sales lead, such as based on the user's role, the status of the qualified sales lead (e.g., whether it is a new qualified sales lead for the user), defined processing for the sales organization of the user (e.g., defined criteria), etc. If so, the subroutine continues to step 515 to obtain one or more reasons from the user for the rejection, and in step 520 optionally obtains one or more suggested actions from the user for the rejected qualified sales lead. In step 523, the subroutine then marks the qualified sales lead as rejected (e.g., by changing a status or flag field within the sales lead data item instance) and de-assigns the sales lead from the current user. In other embodiments, a new rejected lead data item instance could instead be created based on the qualified sales lead.

The subroutine next continues to step 525 to determine one or more actions to take with respect to the rejected qualified sales lead, such as based on any suggested actions and/or on previously defined processing for the sales organization to which the user belongs. In step 530, the subroutine determines whether the action determined is to send the rejected sales lead back to the user that originally qualified it for additional processing. If so, the subroutine continues to step 535 to transform the rejected qualified sales lead to a preliminary unqualified sales lead, and in step 540 assigns the transformed preliminary sales lead to the original user. In step 545, the subroutine then notifies the original user of the rejection of the qualified sales lead and of the reasons for the rejection (e.g., by displaying the sales lead to that user as part of their list of preliminary sales leads along with associated information for the rejection reason), as well as any suggested actions for the rejected sales lead that are appropriate for the original user (e.g., to gather additional information of an indicated type).

After step 545, or if it was instead determined in step 530 that the determined action was not to send the rejected sales lead back to the original user for further processing, the routine continues to step 550 to determine whether the action is to notify one or more users of the rejection in order to provide feedback. If so, the subroutine continues to step 555 to determine one or more appropriate users to notify, such as the original qualifying user, a supervisor of the original user and/or of the current user, a user whose role includes handling rejected qualified sales leads (e.g., in order to improve the qualifying process), etc. After step 555, the subroutine continues to step 560 to notify the determined users of the rejection and of the reasons, as well as of any suggested actions that are appropriate for those users.

After step 560, or if it was instead determined in step 550 that the action was not to notify another user to provide feedback, the subroutine continues to step 565 to perform any other determined actions as appropriate. For example, in some embodiments, automated processing may be performed based on one or more qualified sales lead rejections in order to improve future processing of qualified sales leads, such as to adjust criteria (e.g., thresholds) used for the original qualifying user, to alter calculations used to automatically assess a potential value of a sales lead, etc. After step 565, or if it was determined in step 510 that the user was not authorized to perform the rejection, the subroutine continues to step 599 and returns.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method comprising:

causing a computing system to provide an indication to a first sales development representative (SDR) of a first preliminary sales lead assigned to the first SDR, wherein the first preliminary sales lead represents an individual or organization with an expressed interest in purchasing one or more items from the sales organization;

receiving information about the first preliminary sales lead, wherein the information is information gathered by the first SDR;

causing the computing system to assess whether the information satisfies a first set of predefined criteria, wherein the predefined criteria comprise criteria for assessing a potential value to the sales organization of the first preliminary sales lead;

receiving a qualifying input from the first SDR at the computing system;

in response to receiving the qualifying input, causing the computing system to create a first qualified sales lead corresponding to the first preliminary sales lead;

providing an indication of the first qualified sales lead to a first sales representative (SR) via the computing system, for attempted conversion to a sales opportunity, wherein the first SR is distinct from the first SDR;

causing the computing system to determine whether a disqualification input has been received, wherein the disqualification input indicates that the first SR has determined that the qualifying of the first qualified sales lead was incorrect;

receiving at the computing system input from the first SR indicating a reason for the determination, if the disqualification input has been received;

causing the computing system to create an indication that the first qualified sales input is no longer qualified, if the disqualification input has been received;

providing feedback to one or more users within the sales organization, other than the first SR, via the computing system, if the disqualification input has been received, wherein
the feedback comprises
a notification that the first qualified sales input is no longer qualified, and
the reason for the determination,
the computing system provides a first graphical user interface to the first SDR and a second graphical user interface to the first SR,
the causing the computing system to provide the indication to the first SDR of the first preliminary sales lead comprises displaying the indication to the first SDR, using the first graphical interface,
the providing the indication of the first qualified sales lead to the first SR comprises displaying the indications to the first SR, using the second graphical interface,
the receiving the qualifying input from the first SDR occurs in response to the first SDR selecting from among qualifying controls displayed on the first graphical user interface, and
the disqualification input was received in response to the first SR selecting from among rejection controls displayed on the second graphical user interface.

2. The method of claim 1 further comprising:
receiving additional information at the computing system about the first preliminary sales lead, wherein
the additional information is information gathered by the first SDR based on the reason for the determination.

3. The method of claim 1 further comprising
in response to multiple preliminary sales leads qualified by the first SDR having been previously rejected, causing the computing system to adjust a threshold included in the predefined criteria.

4. The method of claim 1 further comprising
notifying the first SDR to alter their future manual assessing of potential values for their assigned sales leads, if the disqualification input has been received, and
receiving input at the computing system indicating that the first SDR has altered their future manual assessing of potential values for their assigned sales leads.

5. The method of claim 1 further comprising
automatically performing multiple sales forecasts for the sales organization over a period of time, using the computing system, wherein
each sales forecast is based on information currently available about the sales opportunities that are currently identified, and
each sales forecast comprises an indication of likely sales revenue for the sales organization for a specified period of time that is based on the potential sales of specified items for the sales opportunities but that is not based on information about sales leads for which corresponding sales opportunities have not been identified.

6. The method of claim 1 further comprising
causing the computing system to identify the preliminary sales lead from one of multiple sales prospects produced from a sales campaign.

7. The method of claim 1 wherein
the disqualification input was received in response to the first SR determining that the qualifying of the first qualified sales lead was incorrect due to the actual likely value of the qualified sales lead being less than the likely value assessed by the first SDR who performed the qualifying.

8. The method of claim 1 wherein
the disqualification input was received in response to the first SR determining that the qualifying of the first qualified sales lead was incorrect because the first SDR did not gather sufficient information corresponding to the sales lead before the qualifying.

9. The method of claim 1 wherein
information displayed to users via the graphical user interfaces and capabilities provided to users via accessible controls of the graphical user interfaces vary based on roles of the users.

10. The method of claim 1 wherein
the computing system is a server computer and provides sales lead management processing to each of multiple unrelated two-tiered sales organizations via remote clients of the sales organizations, the computing system providing a multi-tenanted hosted environment by storing information specific to each of the client sales organizations and performing processing specific to each of the client sales organizations.

11. A computer-readable storage medium encoded with computer-executable code configured to cause a computing system to perform a method comprising:
causing the computing system to provide an indication to a first sales development representative (SDR) of a first preliminary sales lead assigned to the first SDR, wherein
the first preliminary sales lead represents an individual or organization with an expressed interest in purchasing one or more items from the sales organization;
receiving information about the first preliminary sales lead, wherein the information is information gathered by the first SDR;
causing the computing system to assess whether the information satisfies a first set of predefined criteria, wherein
the predefined criteria comprise criteria for assessing a potential value to the sales organization of the first preliminary sales lead;
receiving a qualifying input from the first SDR at the computing system;
in response to receiving the qualifying input, causing the computing system to create a first qualified sales lead corresponding to the first preliminary sales lead;
providing an indication of the first qualified sales lead to a first sales representative (SR)-via the computing system, for attempted conversion to a sales opportunity, wherein the first SR is distinct from the first SDR;
causing the computing system to determine whether a disqualification input has been received, wherein
the disqualification input indicates that the first SR has determined that the qualified of the first qualified sales lead was incorrect;
receiving at the computing system input from the first SR indicating a reason for the determination, if the disqualification input has been received;
causing the computing system to create an indication that the first qualified sales input is no longer qualified, if the disqualification input has been received;

providing feedback to one or more users within the sales organization, other than the first SR, via the computing system, if the disqualification input has been received, wherein
the feedback comprises
a notification that the first qualified sales input is no longer qualified, and
the reason for the determination,
the computing system provides a first graphical user interface to the first SDR and a second graphical user interface to the first SR,
the causing the computing system to provide the indication to the first SDR of the first preliminary sales lead comprises displaying the indication to the first SDR, using the first graphical interface,
the providing the indication of the first qualified sales lead to the first SR comprises displaying the indications to the first SR, using the second graphical interface,
the receiving the qualifying input from the first SDR occurs in response to the first SDR selecting from among qualifying controls displayed on the first graphical user interface, and
the disqualification input was received in response to the first SR selecting from among rejection controls displayed on the second graphical user interface.

12. The computer-readable storage medium of claim 11 wherein
the computer-readable storage medium is a memory of a computing device.

13. The computer-readable storage medium of claim 11, the method further comprising:
receiving additional information at the computing system about the first preliminary sales lead, wherein
the additional information is information gathered by the first SDR based on the reason for the determination.

14. The computer-readable storage medium of claim 11, the method further comprising
in response to multiple preliminary sales leads qualified by the first SDR having been previously rejected, causing the computing system to adjust a threshold included in the predefined criteria.

15. The computer-readable storage medium of claim 11, the method further comprising
notifying the first SDR to alter their future manual assessing of potential values for their assigned sales leads, if the disqualification input has been received, and
receiving input at the computing system indicating that the first SDR has altered their future manual assessing of potential values for their assigned sales leads.

16. The computer-readable storage medium of claim 11, the method further comprising
automatically performing multiple sales forecasts for the sales organization over a period of time, using the computing system, wherein
each sales forecast is based on information currently available about the sales opportunities that are currently identified, and
each sales forecast comprises an indication of likely sales revenue for the sales organization for a specified period of time that is based on the potential sales of specified items for the sales opportunities but that is not based on information about sales leads for which corresponding sales opportunities have not been identified.

17. The computer-readable storage medium of claim 11, the method further comprising
causing the computing system to identify the preliminary sales lead from one of multiple sales prospects produced from a sales campaign.

18. The computer-readable storage medium of claim 11, wherein
the disqualification input was received in response to the first SR determining that the qualifying of the first qualified sales lead was incorrect due to the actual likely value of the qualified sales lead being less than the likely value assessed by the first SDR who performed the qualifying.

19. The computer-readable storage medium of claim 11, wherein
the disqualification input was received in response to the first SR determining that the qualifying of the first qualified sales lead was incorrect because the first SDR did not gather sufficient information corresponding to the sales lead before the qualifying.

20. The computer-readable storage medium of claim 11 wherein
information displayed to users via the graphical user interfaces and capabilities provided to users via accessible controls of the graphical user interfaces vary based on roles of the users.

21. The computer-readable storage medium of claim 11, wherein
the computing system is a server computer and provides sales lead management processing to each of multiple unrelated two-tiered sales organizations via remote clients of the sales organizations, the computing system providing a multi-tenanted hosted environment by storing information specific to each of the client sales organizations and performing processing specific to each of the client sales organizations.

* * * * *

UNITED STATES PATENT AND TRADEMARK OFFICE
CERTIFICATE OF CORRECTION

PATENT NO. : 7,664,668 B2
APPLICATION NO. : 10/737946
DATED : February 16, 2010
INVENTOR(S) : Gregory P. Lissy et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1581 days.

On sheet 7 of 10, in Figure 2, Ref. Numeral 226, line 2, delete "opportunies" and insert -- opportunities --, therefor.

In column 18, line 54, in claim 11, delete "(SR)-via" and insert -- (SR) via --, therefor.

In column 18, line 60, in claim 11, delete "qualified" and insert -- qualifying --, therefor.

Signed and Sealed this

Fourteenth Day of September, 2010

David J. Kappos
*Director of the United States Patent and Trademark Office*